United States Patent Office 3,616,517
Patented Nov. 2, 1971

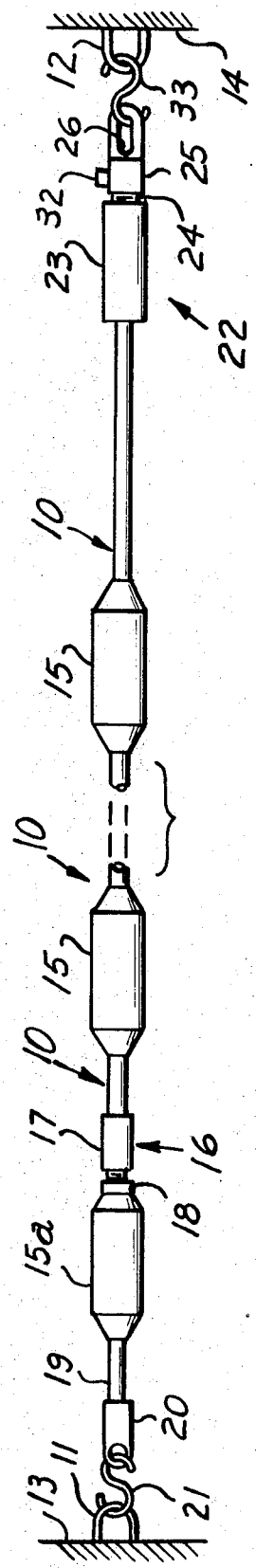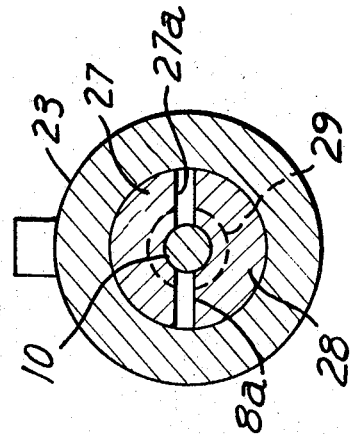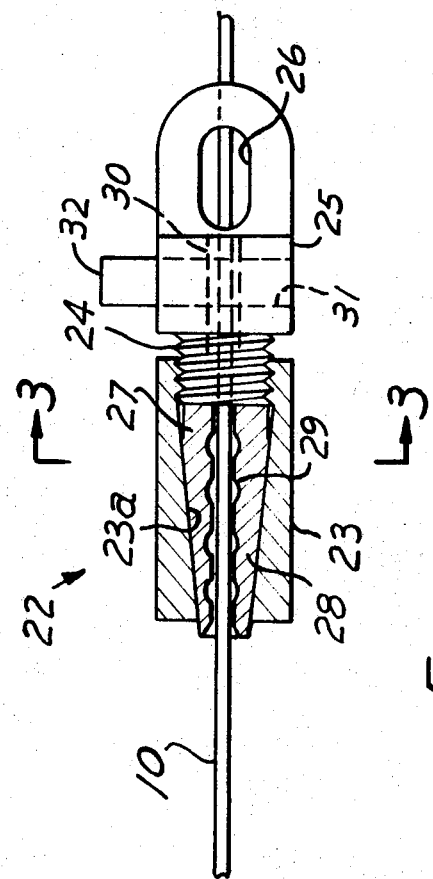

3,616,517
MEANS AND METHOD OF CLAMPING, CUTTING AND EXTENDING CABLE
David A. Stanwood and Billy G. Epperson, Jr., West Covina, Calif., assignors to Swimquip, Inc., El Monte, Calif.
Filed Aug. 11, 1969, Ser. No. 849,103
Int. Cl. B23p *17/00, 19/00;* B21d *39/00*
U.S. Cl. 29—414                                7 Claims

ABSTRACT OF THE DISCLOSURE

A cable clamping and cutting device comprising a body having a bore through which the cable passes and a hollow nut threadable onto the body, so that the cable passes through the nut and the bore. Tapered wedging elements are placed within the nut which engage correspondingly tapered inner surfaces of the nut so that when the nut is turned on the threads the wedge members grip the cable. The body portion has a second bore, intersecting the first-mentioned bore, in which a punch may be inserted, which when struck a blow will sever the cable within the body while the cable is clamped. The body contains an eye member which can be engaged by a suitable hook or the like as a cable termination.

---

The invention relates to a cable clamp and cutter combination and a method of extending cable between a pair of cable supports and has for an object to provide a simple and effective means and method for accomplishing the same.

It is frequently desired to secure and extend a length of cable between two fixed points. A typical example is found in the spaced parallel float-bearing cables placed lengthwise in swimming pools to define racing lanes. It is a common practice to hook the two opposite ends of such a cable to fixed immovable support elements such as eyes or rings or the like embedded in concrete at opposite ends of the pool. After the cable is thus installed, it may then be tightened, that is, tensioned, to make it fairly taut, by a suitable cable tightener.

In accordance with the present invention, a simple and easy-to-operate combined clamp and cutter is attached to the cable which establishes its desired length, and the cable is cut at that position so that it then can immediately be hooked to its fixed support element. The clamping and cutting arrangement comprises an eye member threadable into a nut member provided with an internal taper which receives a tapered wedge means adapted to grip the cable. The cable passes the wedge within the nut and through the eye element. The eye element is provided with a punch, which on being struck with an object like a hammer will cut off the excess cable, so that the cable can be pulled to straighten it out by engaging the eye with a suitable hook. The cable may then if desired be made taut by operation of a cable tightener placed along the length of the cable.

The foregoing and other features of the invention will be better understood from the following detailed description and the accompanying drawing of which:

FIG. 1 shows a cable provided with floats and a cable tightener stretched between two fixed supports, one end of which has attached thereto a cable clamp and cutter combination according to the present invention;

FIG. 2 is a view partially in cross-section of the cable clamp and cutter shown in FIG. 1; and FIG. 3 is a cross-section view taken at line 3—3 of FIG. 2.

FIG. 1 of the drawing shows a cable 10 extending between two eye or ring members 11 and 12 embedded in fixed supports 13 and 14, respectively, which may be concrete walls or decks of a swimming pool. The cable passes through the longitudinal axis of a number of floats 15 strung in tandem along the cable, which float on top of the water, holding the cable up and indicating the side of the lane. The float 15a at one end of the cable is in the form of a cable tightener. The end of the cable 10 at this member 15a is secured in a clamp 16 which may comprise a nut 17 threaded onto the protruding threaded bolt portion of a member 18 fixed to the hub of member 15a. Details of the clamp are no part of this invention, and any compatible form of clamp may be used. For example, the nut 17 may be tapered internally to receive a pair of similarly tapered wedge members which are then clamped on the end of the cable by tightening the nut onto the bolt end of member 18.

The opposite end of member 15a has attached to it at its longitudinal axis, a protruding rod 19 which threads within an elongated sleeve (not shown) fixed within member 15a along its longitudinal axis. The outside end of rod 19 has attached to it an eye member 20 which receives one end of an S-hook 21, the other end of which hooks over the fixed member 11.

After the cable is strung through all of the floats 15 (and the float 15a), a clamp and cutter combination 22 according to this invention is slid onto the cable at the end thereof opposite the tightener float 15a. This comprises a nut 23 through which the cable is passed, the nut being threadable onto a protrusion or stud 24 protruding from a body 25, the opposite end of which carries an eye 26. The inner surface 23a of the nut tapers in a frusto-conical shape from the threads at stud 24 to smaller diameters at the opposite end, and this internal part of the nut receives a pair of wedge members 27 and 28, between which the cable passes, such that the wedge members are separated from each other. The outer circumferential surfaces of the wedge members conform with the inner surface of sions to those of the nut, so that the outer surfaces of the wedge members conform with the inner surfaces of the nut.

When the nut is tightened onto the threads 24, the pair of wedge members are thus moved closer to each other and with their larger ends pressed against stud 24. They thus cooperate to bind tightly against the cable 10 as shown in FIGS. 2 and 3. Under this condition, the juxtaposed edge 27a and 28a of the wedge members are still out of contact with each other. To augment the gripping action of the wedge members on the cable, the wedge members are provided with a number of scallops 29, the edges of which tend further to bind the cable.

The body portion 25 has a bore 30 passing through it and the stud portion 24 along the longitudinal axis in the direction of the cable. The cable thus extends through this bore to the eye member 26, the bore being large enough in diameter to accommodate the cable easily. A second bore 31 passes transversely through the body 25 perpendicular to, and intersecting, the bore 30. The bore 31 is at least as large in diameter as the bore 30, and it is adapted to have placed within it a solid cylindrical punch member 32 which slidably fits within the bore 31. The punch member can be about as long as, or nearly as long as the bore 31.

When the cable 10 is passed through the bore 30, the punch member 32 is withdrawn out of the body 25 at least far enough to allow the cable to pass. Whenever it is desired to cut the cable, the protruding end of the punch member 32 is struck by a hammer or the like, forcing the punch 32 across the intersecting bore 30 and cutting the cable at that position, leaving the cable securely clamped between the wedges within the nut 23. The eye 26 may then be secured to the fixed member 21 by a suitable S-hook 33.

The racing float cable line will ordinarily be assembled by first attaching the end of the cable 10 to the tightening member 15a at clamp 16, following which the several floats 15 will be slid along the cable, and lastly the clamp and cutter assembly 22 will be slid over the cable with the end of the cable protruding from the body at the eye. With the cable pulled fairly straight, the desired distance of the eye 26 from the permanent hooking member 12 will be estimated, and with the member 22 in that position in relation to the cable, the nut 23 will be tightened on the threads of stud 24 to clamp the two halves of the wedge onto the cable. Then the body 25 will be placed on a surface such as a plank with the punch member 32 protruding upward, and the cable will be severed by striking the punch a blow with the hammer. Then the eye 26 will be hooked to the member 12 by the S-member 33. The final desired tautness of the cable and float assembly will then be accomplished by rotating the tightening member 15a relative to the threaded rod 19 to shorten the length of rod which protrudes from member 15a, until the cable has reached the desired degree of tautness.

It will be recognized that by our invention we have produced a simple and effective means and method of cutting a cable to a desired length and securing it at its ends.

What is claimed is:

1. A device for clamping and cutting a cable, comprising a body member containing a first bore through which the cable can pass, and having a hooking means and a threaded means, a hollow nut through which the cable can pass, having a tapered internal surface and provided with threads on an end thereof adapted to engage the threads of the body, wedge means within the nut having a wedging surface engaging the inner surface of the nut and binding the cable when the nut is threaded onto the threads of the body, said body having a second bore intersecting the first-mentioned bore, whereby a punch inserted in the second bore severs the cable within the body when struck a blow.

2. A device according to claim 1 in which the hooking means is an eye member at one end of the body and the threaded means is a protrusion from the other end of the body engaging the nut.

3. A device according to claim 1 in which the wedge means comprises a plurality of wedge members each of which engages the inner surface of the nut and also the cable surface within the nut, whereby the wedge members clamp the cable when the nut is threaded to the threaded means of the body.

4. A device according to claim 3 in which the surfaces of the wedge members which engage the cable are scalloped for gripping the cable.

5. A device according to claim 3 in which the inner surface of the nut is frusto-conical with its largest diameter next to the body, and the wedge members have outer surfaces which are also frusto-conical in conformity with the frusto-conical surface of the nut whereby threading of the nut to the threaded means of the body presses the ends of the wedge members against the body while the wedge members are gripping the cable.

6. A device according to claim 5 in which the longitudinal axis of the first bore and of the nut are collinear with each other and with the cable gripped between the wedge members.

7. The method of extending a cable having two ends, tautly from a first point to a second point which comprises attaching a first of the cable ends to a device having a rod threaded into it so that the device can be shortened by turning the rod relative to the device, attaching the end of said device opposite said first cable end to said first point, threading the second end of the cable through a cable clamping and cutting mechanism comprising a hollow nut containing wedge members and threaded to a body having a bore aligned with the axis of the nut so that the cable passes through the nut and the bore where it is clamped by the wedge members when the nut is turned, then cutting the cable at the body by delivering a blow to a punch movable in a transverse path across the clamped cable, then attaching said mechanism to said second point, and then shortening said device by turning its said rod, to make the cable taut.

References Cited

UNITED STATES PATENTS

| 2,629,921 | 3/1953 | Gray | 29—430 |
| 2,811,773 | 11/1957 | Baskin | 29—452 |
| 3,498,340 | 3/1970 | Epstein | 140—113 |

THOMAS H. EAGER, Primary Examiner

U.S. Cl. X.R.

29—200 B, 429, 452; 140—113

O-1894

PO-1050
(5/69)

UNITED STATES PATENT OFFICE
CERTIFICATE OF CORRECTION

Patent No. 3,616,517     Dated November 2, 1971

Inventor(s) David A. Stanwood and Billy G. Epperson, Jr.

It is certified that error appears in the above-identified patent and that said Letters Patent are hereby corrected as shown below:

In the Patent

Column 2, lines 37 and 38

Change "conform with the inner surface of sions" to

--are similar in frusto-conical dimensions--

Column 2, line 39

Change "surfaces" to --surface--

Signed and sealed this 18th day of April 1972.

(SEAL)
Attest:

EDWARD M. FLETCHER, JR.          ROBERT GOTTSCHALK
Attesting Officer                Commissioner of Patents